United States Patent [19]

Scolari et al.

[11] Patent Number: 4,613,847
[45] Date of Patent: * Sep. 23, 1986

[54] EMERGENCY SIGNAL

[75] Inventors: John E. Scolari, La Mesa; Robert T. Warner, Poway; Joe E. Deavenport, San Diego, all of Calif.

[73] Assignee: Life Light Systems, San Diego, Calif.

[*] Notice: The portion of the term of this patent subsequent to Dec. 18, 2001 has been disclaimed.

[21] Appl. No.: 632,308

[22] Filed: Jul. 23, 1984

Related U.S. Application Data

[63] Continuation-in-part of Ser. No. 521,276, Aug. 8, 1983, abandoned, which is a continuation-in-part of Ser. No. 466,326, Feb. 14, 1983, Pat. No. 4,489,306, which is a continuation of Ser. No. 318,499, Nov. 5, 1981, abandoned.

[51] Int. Cl.[4] ............................................. B60Q 1/00
[52] U.S. Cl. .......................... 340/114 R; 340/114 B; 340/107; 340/77; 340/81 R; 340/84; 340/87; 340/90; 340/105; 116/63 P; 116/63 T; 116/63 C; 116/63 R; 40/610; 40/612; 315/200 A
[58] Field of Search ............... 340/114 R, 114 B, 107, 340/87, 90, 94, 84, 102, 103, 110, 116, 119, 122, 123; 116/63 R, 63 C, 63 T, 63 P; 40/612, 610, 564, 571, 573, 574; 315/200 R, 200 A, 201, 209 R, 211

[56] References Cited

U.S. PATENT DOCUMENTS

| | | | |
|---|---|---|---|
| 2,843,836 | 7/1958 | McDonald, Jr. | 340/87 |
| 2,905,863 | 9/1959 | Martin et al. | 340/77 |
| 3,738,309 | 6/1973 | Nicholl | 340/114 B |
| 4,489,306 | 12/1984 | Scolari | 340/114 B |

FOREIGN PATENT DOCUMENTS

| | | | |
|---|---|---|---|
| 2155684 | 5/1973 | Fed. Rep. of Germany | 340/114 R |
| 1563638 | 4/1969 | France . | |

Primary Examiner—Donnie L. Crosland
Attorney, Agent, or Firm—Baker, Maxham & Jester

[57] ABSTRACT

A self-contained emergency signal has a base which contains a battery and a high-intensity flash/lamp actuating unit. The actuating unit is electrically connected to a battery and to a high-intensity flash lamp. A switch turns the actuating unit on and high-intensity lamp bursts are displayed through a transparent, translucent, polarized, colored or symbol containing a lens arrangement, or a combination of such elements. The emergency signal may have different forms such as cylindrical, elliptical, rectangular or triangular. In some embodiments the lens arrangements are in telescopic relationship to the base, or may be collapsible to a compact, easy-to-carry device. Exemplary circuitry for use with the various emergency signal embodiments is also part of the invention.

111 Claims, 25 Drawing Figures

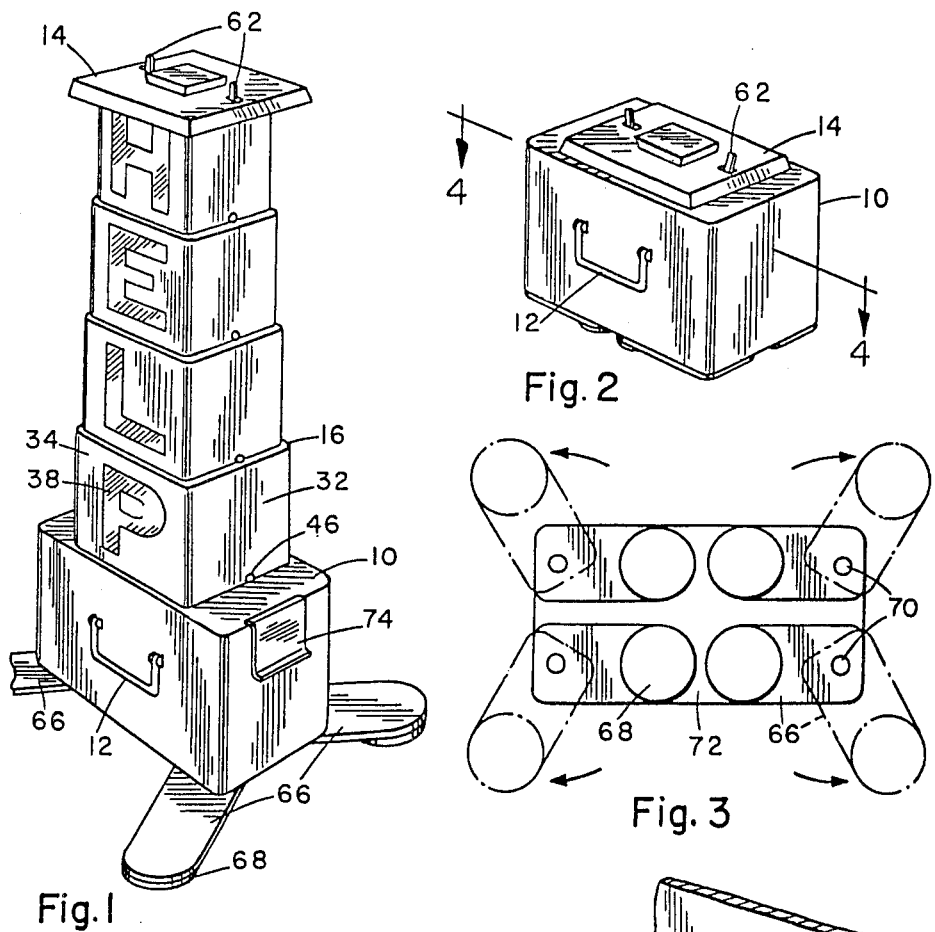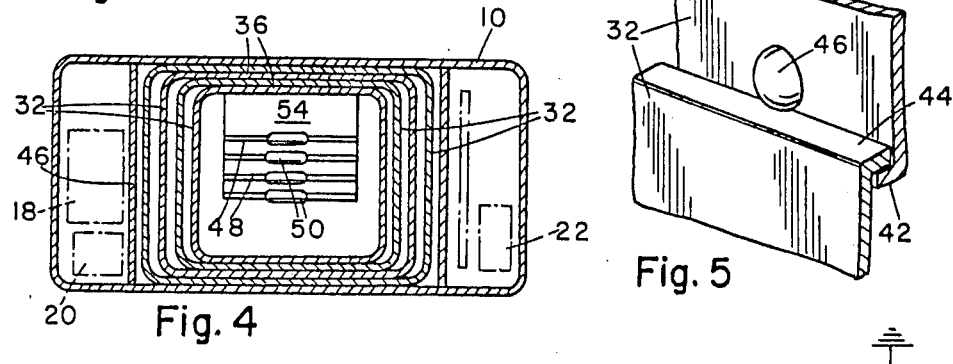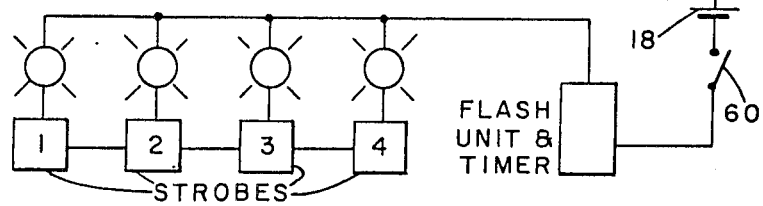

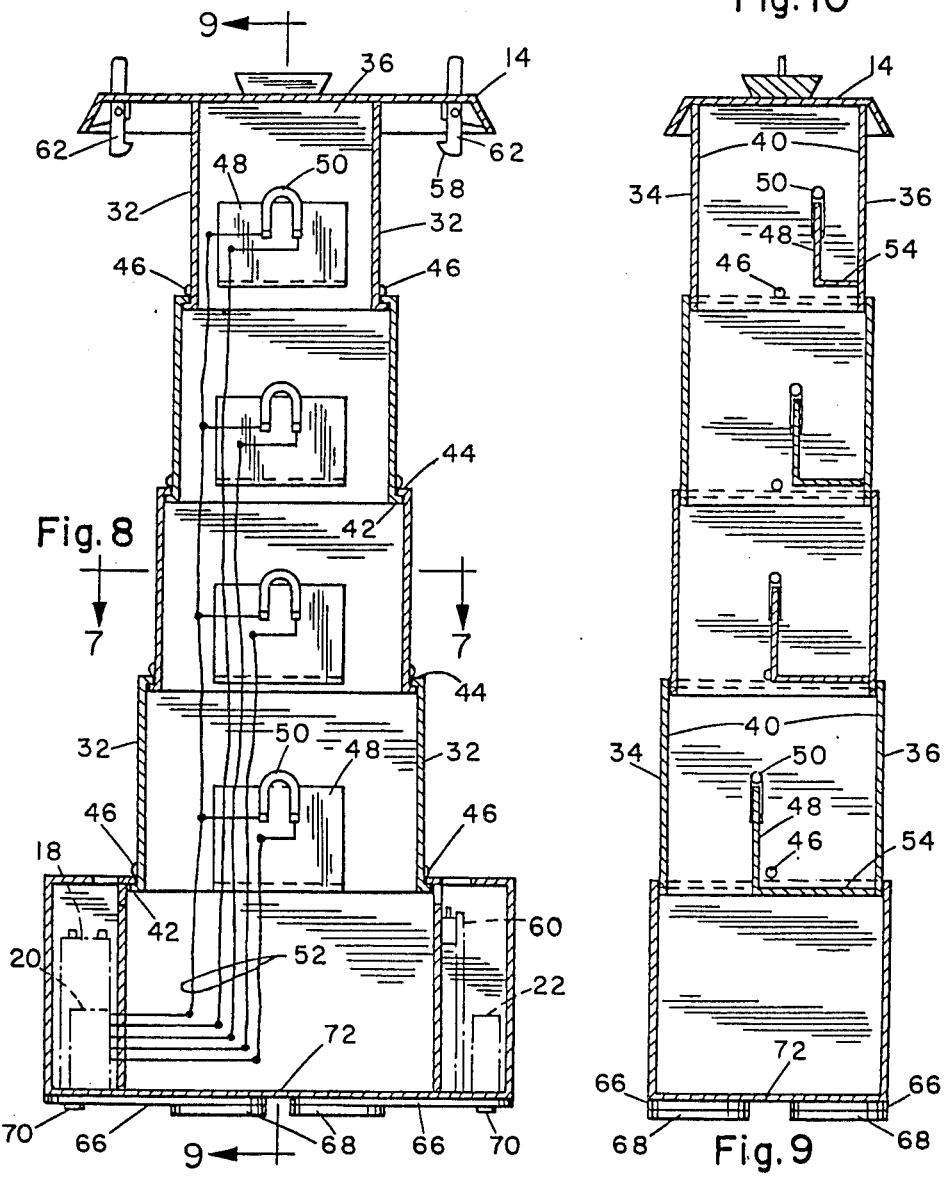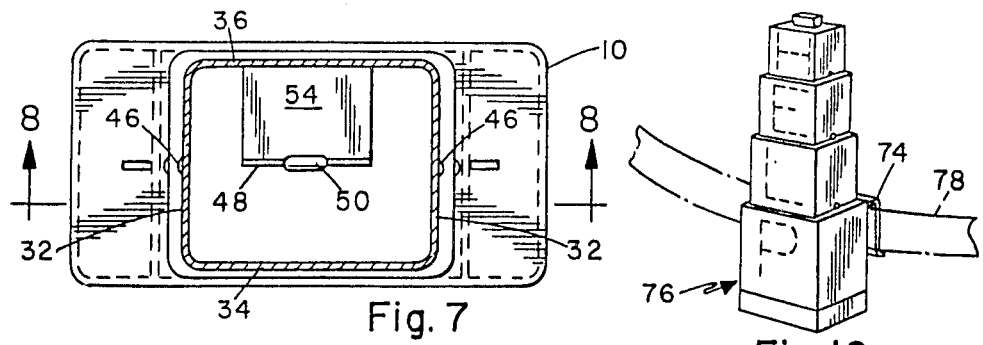

EMERGENCY SIGNAL

REFERENCE TO RELATED APPLICATIONS

This application is a continuation-in-part of application Ser. No. 521,276, filed Aug. 8, 1983, now abandoned, which in turn is a continuation-in-part of application Ser. No. 466,326, filed Feb. 14, 1983, now U.S. Pat. No. 4,489,306 which is a continuation of application Ser. No. 318,499, filed Nov. 5, 1981, now abandoned.

FIELD OF THE INVENTION

This invention relates generally to emergency signal devices and more particularly to such devices with high intensity flash elements, a number of which flash in sequence.

BACKGROUND OF THE INVENTION

Emergency signal devices are employed in various forms in a number of different situations. By sheer numbers of vehicles that are disabled on the highways for varying lengths of time, there is the obvious highway application for emergency signal devices.

Backpackers and campers also need some type of emergency signal device. Especially in the western and southwestern United States, backpackers may become lost in deserts, in mountainous woods, in the snow or in other situations in which search crews may not find them in time to save their lives. This is particularly a problem with children who wander away from campsites or from trails and possibly perish in the wilderness.

In addition to the traffic safety and camper uses, emergency signals are also needed for downed aircraft and disabled boats. Mountain climbers and desert motorcyclists and others who could find themselves in a dangerous position would find a compact and lightweight emergency signal device to be vital.

Some situations may call for a radio transmitter for help in isolating the victims by an aerial search crew with radio search techniques. Other situations call for a visual means of finding the victims, or a visual means of notifying others that there is a problem, such as along the highway.

Yet another and rarely addressed emergency situation involves invalids and older people. If suddenly stricken with a debilitating problem, a low-cost remote controlled sign that would flash a message such as "Help", or simply light control panels, in a window, could save the lives of older or disabled people who are so stricken that are unable to get to the telephone. Such a device could also include other attention getting means such as an audible signal.

There is a need therefore for a compact, versatile emergency signal that lends itself to a wide variety of applications and is relatively economical to manufacture and produce.

Power supplies have been proposed for electronic flash purposes where the circuit, operating from a power source, functions with means for charging and discharging a capacitor for operating a flash lamp. Typically, many of the systems have had means of some type for sensing the capacitor voltage and disabling the charging circuit after the capacitor has been fully charged, to save power.

The prior art systems mentioned above generally have limitations which make them not suitable for use for emergency signal devices which require an immediate bright flash in response to actuation, rapid recharging to afford repetitive or sequential flashing, or both, and relative light weight. These prior systems typically have a relatively long charging time, between 6 and 30 seconds, or have relatively large sources of power, such as large or bulky batteries, or are connected to an AC source and are thereby non-portable. Also these systems, in order to achieve the desired results, are frequently quite complex as well as being too large to be easily portable in vehicles, such as automobiles, trucks, boats, airplanes, cycles or for backpacking and hiking. Another problem with many prior art systems is that the voltage sensing mechanism is not precise so there is a relatively large swing between full charge of the flash capacitor and the voltage level at which the charge again builds up. They often use a linear technology or a flyback transformer in the feedback circuit.

SUMMARY OF THE INVENTION

The present invention fulfills the above stated needs, and is adaptable, particularly by the addition of a remote control, for use for invalids or disabled people. It can incorporate a radio transmitter for downed planes, as well as being used for backwoods and nautical applications. The emergency signal can be adapted to virtually any of the emergency situations that may arise.

In a preferred embodiment the invention comprises a base box which is used as a compact container when the signal is not in use, and a series of sequentially smaller telescoping boxes which extend upwardly to form an upright column when the unit is deployed.

Each of the telescoping boxes has one or more faces which have a letter, number or other symbol or indicia either cut out or otherwise displayed thereon. If cut out, the symbol faces would normally be backed by a translucent, transparent, polarized or colored panel. Panel colors may be selected to provide maximum visibility under different weather conditions. Inside each box is a reflector panel parallel to the symbol face, which mounts a light, so that each symbol face corresponding to each box has its own individual light.

The base member which supports the upright column also contains a battery and a timing mechanism so that the symbols may be flashed in sequence. The resultant effectively moving light source maximizes the probability of the signal being noticed under adverse conditions, for example, for use by police and highway patrol cars, instead of flares which can be the cause of explosions of gas tanks, resulting in loss of life and property. The telescoping high-intensity light unit can be deployed faster, with greater visibility and much longer effective life, than is true of several flares as is commonly used. Due to the relatively low current requirements of the strobe lamps, a large sign may be operated with a minimum amount of energy, which will extend battery life and permit operation of the unit for extended periods.

Each box is retained in place by detents which rest on the upper edges of the box beneath, and may be deflected very simply with pressure to cause the telescoping and nesting of the apparatus. The lower base container is provided with swivel feet which may have magnetic inserts to both broaden the base of the unit and enable it to be magnetically attached to ferromagnetic surfaces, such as vehicle bodies. An extendable clip may be mounted on the base of the unit, which permits the device to be attached to a car window when desired.

Alternative embodiments include a car top device having two flash units telescopically connected. The units may flash together or in sequence. A small belt-type emergency flash unit may include a radio signal transmitter and is particularly useful for campers, pilots and on boats in emergency situations. A single triangle-shaped device having a flash lamp inside is also disclosed. A smaller triangular form consisting of reflective tape or plastic is adhered to the larger translucent triangle as a danger warning device. Another embodiment is pyramidal in form, housing a high intensity flash unit, and is collapsible for storage in a limited space.

The controlled high-voltage generator circuit of this invention employs an oscillator to drive a DC/AC inverter connected to a low voltage DC power supply, such as a battery, to switch the power supply on and off at the desired frequency. The inverter also boosts the voltage by a factor of 10 to 15 and then a rectifier and voltage multiplier convert the signal to a high-level DC voltage which is applied to a storage capacitor. A feedback circuit senses the output of the voltage multiplier and applies that voltage to a Schmitt trigger comparator, the output of which controls the operation of the oscillator.

The efficiency and low power loss aspects of the circuit and its components help make this voltage generator particularly adaptable for portable emergency flash units where a rapid recharging rate is necessary.

BRIEF DESCRIPTION OF THE DRAWING

The objects, advantages and features of this invention will be readily apparent from the following detailed description when read in conjunction with the accompanying drawing in which:

FIG. 1 is a perspective view of a preferred embodiment of the invention deployed for use;

FIG. 2 is a perspective view of the unit of FIG. 1 nested for transport and storage;

FIG. 3 is a bottom view of the unit showing in phantom the feet in deployed position;

FIG. 4 is a sectional view taken along line 4—4 of FIG. 2;

FIG. 5 is an enlarged perspective detail illustrating a typical deflected detent tab;

FIG. 6 is a diagrammatic illustration of the electrical system;

FIG. 7 is a sectional view taken along line 7—7 of FIG. 8;

FIG. 8 is a vertical section taken along line 8—8 of FIG. 7.

FIG. 9 is a sectional view taken along line 9—9 of FIG. 8;

FIG. 10 is an isometric view of a modification of the unit in which it is made smaller and provided with a belt clip for personal use;

DESCRIPTION OF THE PREFERRED EMBODIMENTS

Figures 11, 12, 13, 14:
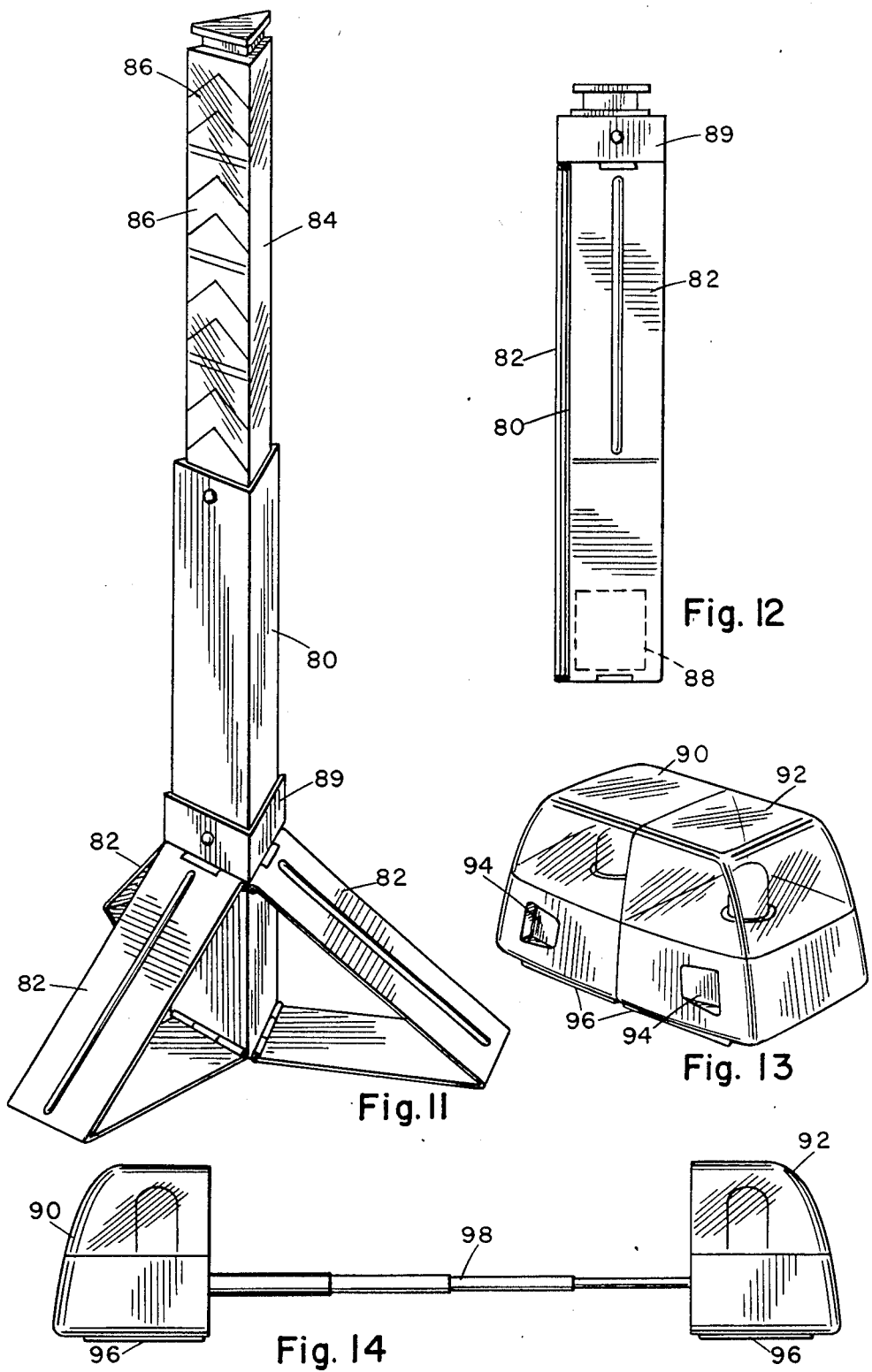
FIG. 11 is a perspective view of a triangular-shaped telescopic device in open position.
FIG. 12 is a front view of the device of FIG. 11 in closed position.
FIG. 13 is a perspective view of a car top emergency signal device in retracted position.
FIG. 14 is a side view of the device of FIG. 13 in extended telescopic position.

One embodiment of the invention is shown in FIG. 1 where several stages of the device are shaped as cubes and arranged in telescoping relationship. A base member 10 comprises a container with a handle 12 so that when the top lid 14 seats on the base member and is latched, as will be described below, the unit is contained in a small configuration as shown in FIG. 2 for convenience of transport and storage. The top panel of container 10 has a rectangular cutout into which telescopically slides the first box-like stage 16. A side compartment in base 10 contains a battery 18 and a strobe and timer unit 20, as shown in FIGS. 4 and 8. On the other side in another compartment is an optional transmitter 22. If the unit incorporates a transmitter, an antenna mechanism may be incorporated in the stacked structure. Additionally, the other compartment may contain an attention getting audible signal means of any appropriate configuration.

Because they are all similar, only first stage 16 will be described in detail. Each section or stage has a pair of lateral walls 32 and longitudinal front and back walls 34 and 36 respectively. The front and back walls may each have a cutout 38 in the shape of a letter or other symbol, backed by a translucent, colored sheet 40, as shown in FIG. 9. With reference to FIG. 5, each stage has a lower lip 42 and an upper shoulder 44 to limit the vertical extension of the units so they do not separate. To maintain them in an extended position, detents 46 on each of the stages rest on the shoulders 44 of the stage beneath, with stage 16 engaging base member 10. These detents are preferably slight protrusions molded as part of the telescoping stages.

Spaced behind the front face 34 of each of the stages is a reflector panel 48, each of which supports a separate light 50. These are preferably strobe lights, that is, lights that produce a high intensity short flash immediately upon being triggered. The strobe lights in the illustrated embodiment are mounted centrally in a cutout in the reflector so that an identical set of symbols, referred to by reference numeral 38, can be cut in the rear face 36. It would also be possible to use only one set of symbols on the front panel and position the strobe lights on the forward facing surface of the reflective panels.

The connection to each of the strobe lights should be made individually as they are preferably fired sequentially rather than simultaneously. A wiring network 52 connects the strobe timer unit 20 to each of the lights as shown. Each of the reflector baffles 48 is supported generally parallel to the front and rear faces of the respective stage on a thin planar support 54 extending from one side of the respective stage (see FIGS. 4 and 9). These supports fall flush against one another when the stages are telescoped together. It is intended that when expanded into its utilization mode each of the sections fits snugly with adjoining sections so that the unit will not admit rain or snow into its interior. Further, steps could be taken to actually waterproof the unit if the environment in which it is to be used calls for this.

Top 14 of the structure, as best shown in FIG. 8, includes switch actuator 58 which actuates normally closed switch 60 in base member 10 when the unit is retracted. In this position, the top is retained on the base, power is removed, and the stages are retained nested within the base container by latch 62 which doubles in function as the switch actuator.

Clip 74, best shown in FIG. 1, could be incorporated as an optional feature for use in engaging the unit on a partially raised car window. The same concept can be carried forth when the device is used on a small personal unit 76 shown in FIG. 10 in which the clip would be used to attach the unit to a belt 78.

In order to provide additional stability for the unit, feet 66 with magnetic terminal pads 68 are pivoted at 70 to the bottom 72 of the base as shown in FIG. 3. These feet lend stability in applications in which wind, irregular terrain, or both, could otherwise topple the signal unit. The magnetic pads facilitate mounting the emergency signal on a metal surface such as an automobile top.

Thus the unit is compact and convenient for transport and storage when not deployed, and can quickly be extended in an emergency situation. When extended, it automatically locks in the extended position and initiates the light flashing sequence, so that despite being in a state of shock, an emergency victim could still possibly have the presence of mind to actuate the mechanism simply by pulling the lid fully up into the position shown in FIG. 1.

Several optional features and variations are possible. If for use in the window of an elderly person or invalid, a remote control actuator may be used in place of the automatic switch 60, and the front faces of the letter blocks covered with a thin, plastic sheet of the same color as the rest of the box so that the letters "HELP" would not appear until the device was turned on. Additionally, the cross sectional shape of the telescopic unit could be made cylindrical, elliptical, triangular, or any other shape as desired. The signal may also be especially adapted for invalids by including a radio transmitter or an audible attention getting signal means, or both.

A unit of triangular cross section is shown in FIGS. 11 and 12. Base 80 has folding support legs 82 on the bottom and signal element 84 telescopically mounted thereto. When retracted as shown in FIG. 12, the result is a compact, slim unit. The signal faces 86 are in the shape of arrows and when flashed separately and sequentially, give the impression of a moving signal arrow. It should also be recognized that this embodiment could be used to spell out a word such as "HELP," "STOP" or "SLOW". In this embodiment, a single housing encloses several separate strobe lights. Like the embodiment of FIG. 1, the emergency light is actuated by pulling the elements apart. The battery and strobe control 88 are contained in the bottom of base 80. Legs 82 fold around the control housing, with band 89 sliding up the length of the base as shown in FIG. 12. Alternatively, this unit could also be formed of several telescoping elements, similar to the embodiment of FIG. 1.

A car top emergency signal is shown in FIGS. 13 and 14. Two substantially identical units 90 and 92 are normally secured or latched together by suitable means for storage. They may be small enough to be stored in the glove compartment. They could also be bracket mounted at any convenient location within the automobile. It is contemplated that the tops will be a clear material such as plastic so that the flashing lights are visible from all directions. Each unit is formed with thumb and finger recesses 94 to provide a grip for pulling the units apart. Magnetic rubber pads 96 are positioned on the bottom of each unit so that it will be securely held in place on the top of an automobile. Two parallel telescoping tubing members 98 have one end secured to each unit to enable them to be pulled apart. Any necessary wiring can be run through the tubing. This signal has an appropriate switch, possibly similar to that shown in FIG. 8, which is actuated when units 90 and 92 are separated.

Figures 15, 16:
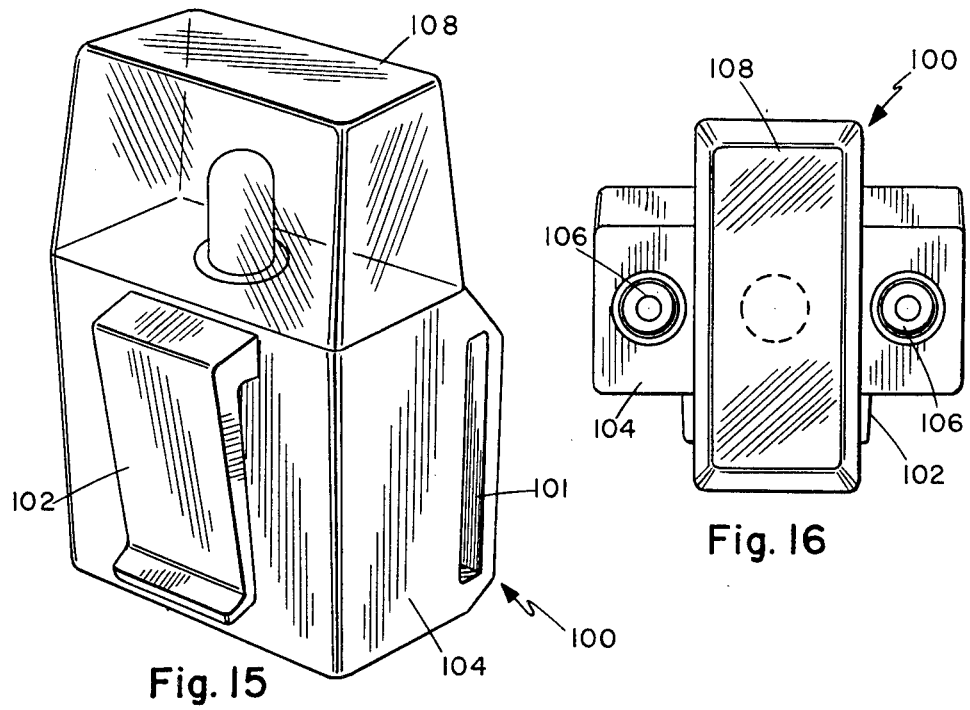
FIG. 15 is a perspective view of a belt-type emergency signal device.
FIG. 16 is a top view of the device of FIG. 15 with the batteries exposed.

A belt emergency signal unit 100 is shown in FIGS. 15 and 16. Slot 101 is adapted to receive a person's belt. A clip 102 is attached to or molded together with base 104, which can hang the unit on a flat surface such as a window or a belt if desired. The base contains the necessary batteries 106 and flash and radio signal control (not shown). Top 108 is rotatable with respect to the base to actuate the high intensity lamp and the radio signal transmitter contained within the base of the signal unit. The rotatable top may be transparent, translucent, polarized or a colored filter type element. The flashing light is visible at great distances from all directions and the radio signals can be received several miles away. As shown in FIG. 16, the batteries are exposed when the top is rotated 90° so they can be replaced. Rotation of the top by 180° actuates the flash control and transmitter. The transmitter is preferably tuned to a single emergency frequency and transmits periodically when actuated.

Figure 17:
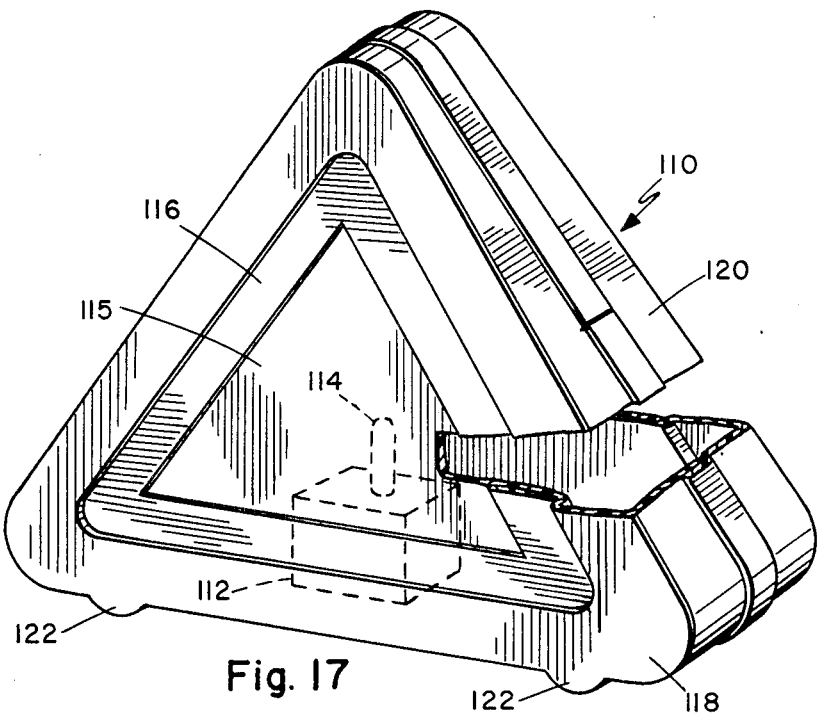
FIG. 17 is a perspective, partially broken away view of a single triangular emergency signal.

A relatively inexpensive element triangular signal 110 is shown in FIG. 17. The usual battery and control 112 are mounted through an opening in the bottom of the unit. The strobe light 114 is mounted to the control element. Either or both triangular faces are transparent so that the flashing light is visible. The primary opening 115 may be surrounded by reflectorized tape 116 for added emergency use. Thus even if the lamp should fail, the emergency signal still provides a highly visible reflection to oncoming headlights.

The body of the triangular device is formed of two identical molded halves 118 and 120 with molded feet 122. The body halves may be made with appropriate detents to hold them together. The flash control is actuated by simple means such as a switch accessible from the bottom of the signal. Several units 110 may be carried in vehicles such as trucks, which are generally required to have emergency signals with minimum requirements for size and visibility. These devices would satisfy such requirements. Even if one became broken or inoperative, the others would provide the necessary warning.

Figures 18, 19, 20:
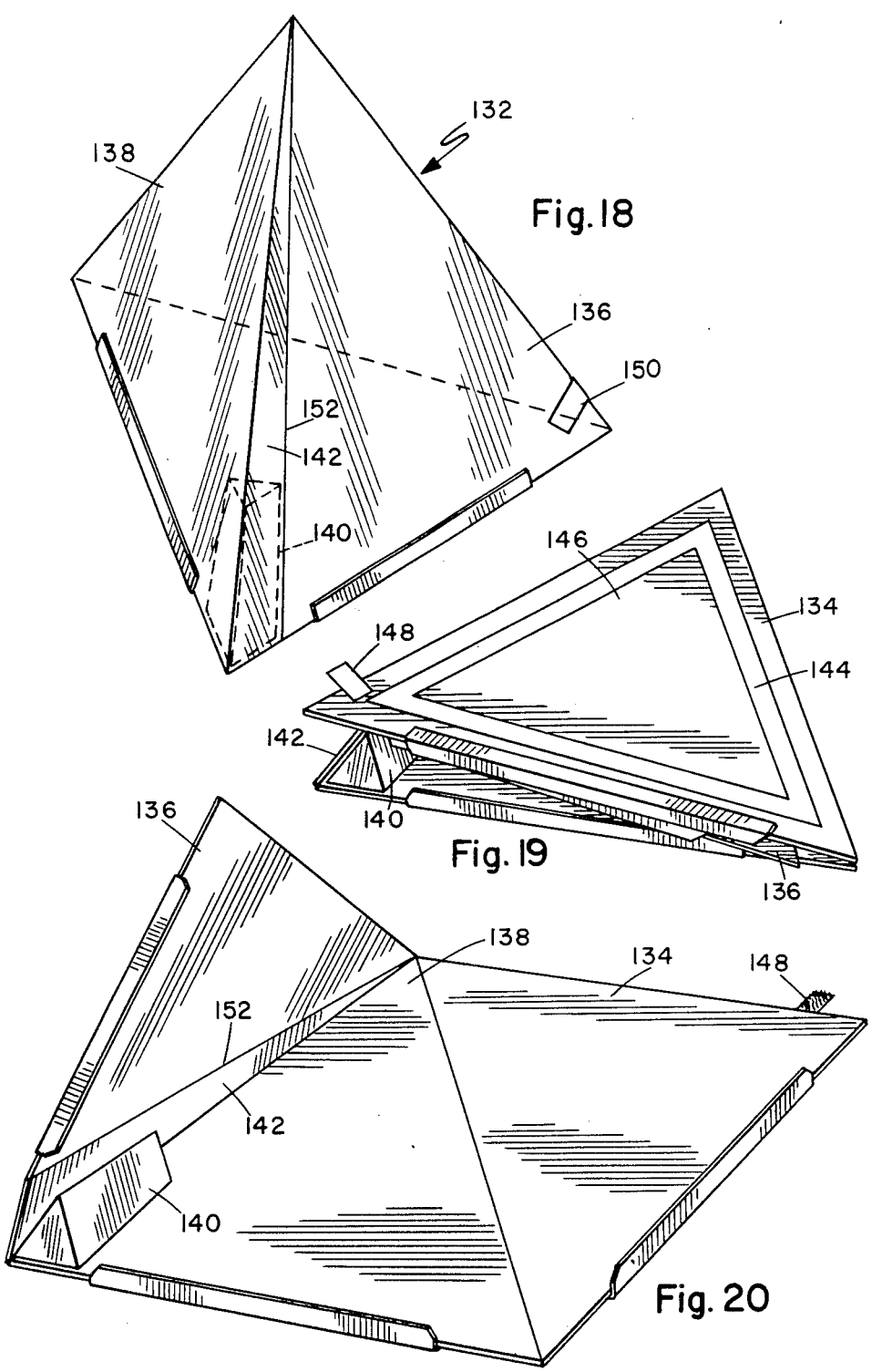
FIG. 18 is a perspective view of a collapsible pyramid according to the invention.
FIG. 19 is a perspective view of the device of FIG. 18 in collapsed condition.
FIG. 20 is a perspective view of the device of FIG. 18 in partially collapsed condition.

Another embodiment of the invention is shown in FIGS. 18-20. This is a collapsible triangular pyramid configuration requiring very limited storage space, but providing reliable, long distance visibility to indicate an emergency situation.

Pyramid unit 132 is formed with three mutually adjacent surfaces 134, 136 and 138. At least one of these surfaces is preferably transparent, but may be translucent, polarized or otherwise colored in the manner of a filter. Contained within the signal device is a light and control unit 140 mounted to narrow triangular panel 142. This panel facilitates folding of the device to a relatively flat configuration, with one edge being slightly thicker than the other two edges to accommodate the control unit.

The transparent face 134 preferably includes reflectorized tape 144 forming a triangle somewhat smaller than the external dimensions of side 134 and surrounding window area 146.

When unit 132 is in the operative position as shown in FIG. 18, separate sides 134 and 136 are held together by suitable flexible means such as hook and pile fastener elements 148 and 150. In this position, control unit 140 and panel 142 are opposite window 146 for clear visibility. A simple switch may be employed to actuate the flashing light.

To fold or collapse the device, the fastener is disengaged, surface 136 is folded inwardly at edge 152 adjacent panel 142, and surface 134 is folded over surface 136. In this condition the device takes little space and several may be stored in a vehicle for use in emergencies.

It may be seen that the emergency signal device structure of this invention can take many forms. All employ a strobe type flash visible through transparent, translucent, polarized or colored windows or domes. They are simply actuated and the high intensity strobe lights provide signals for a long period of time. Those portions of the signal devices disclosed which do not comprise the primary visibility surfaces, such as windows 115 and 146, may be opaque. However, for at least some applications, those other portions may be transparent or translucent or otherwise light transmissive for added visibility.

Figure 21:
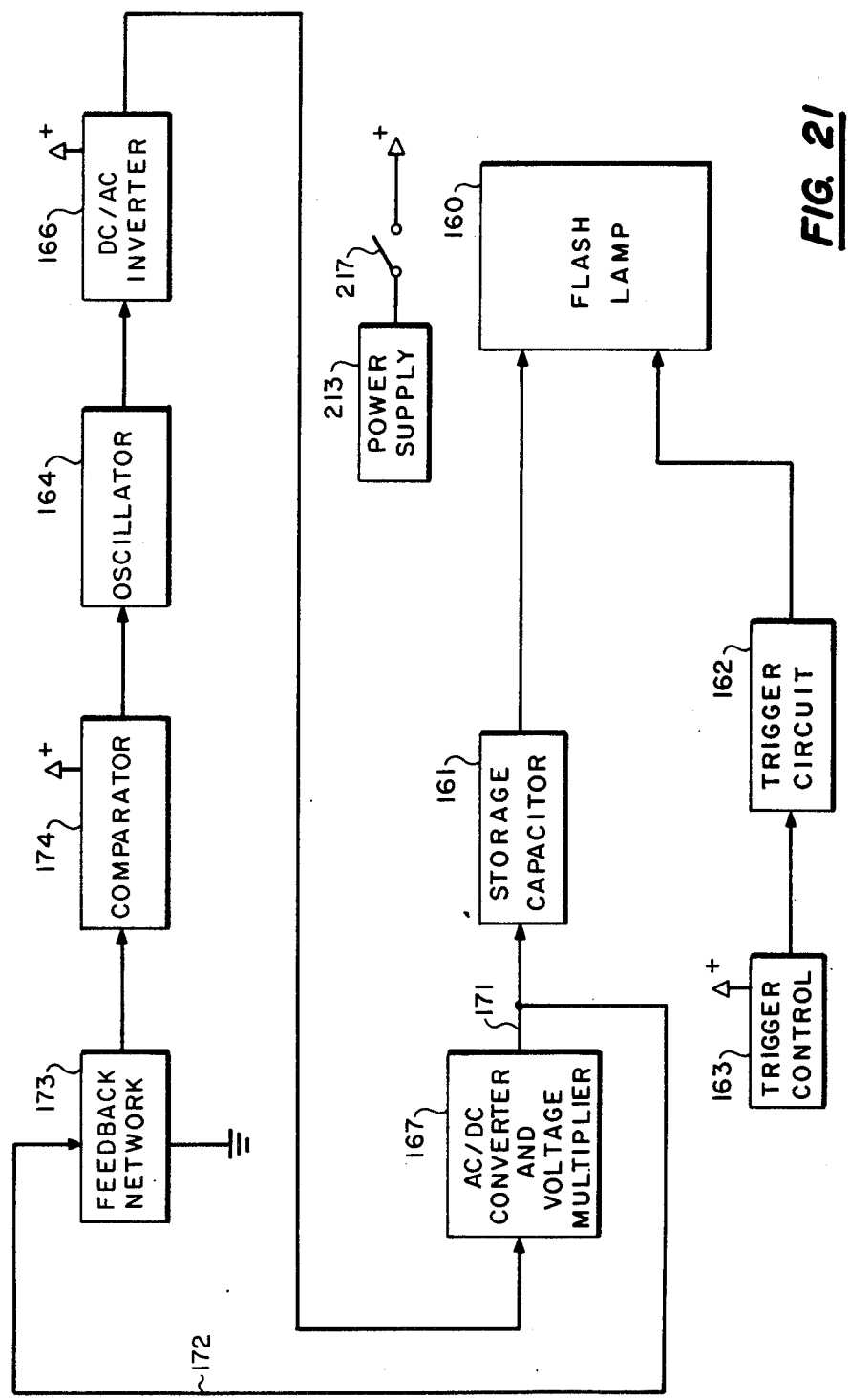
FIG. 21 is a block diagram of the basic controlled high voltage generator employed in the various emergency signal embodiments.

The high voltage generator used to create the desired short duration, high-intensity flashes is shown in FIGS. 21-25. FIG. 21 is a generalized block diagram of the system for generating flashes. Flash lamp 160 has a high voltage, approximately 450 volts, applied to it from storage capacitor 161. The lamp flashes upon actuation by a signal from trigger circuit 162 which discharges the storage capacitor across the flash lamp causing a substantially instantaneous bright flash. The trigger circuit is actuated by a signal from trigger control 163.

A control signal is applied to the input of oscillator 164 which operates at an appropriate frequency, in the range of 20 to 200 KHz, preferably about 25 KHz. A low DC voltage is applied to terminal 165 of DC/AC inverter 166 and, in conjunction with the switching engendered by oscillator 164, the inverter has a substantially amplified AC voltage output, approximately 10 to 15 times its input voltage. The AC output is applied to AC/DC converter/multiplier 167 where the voltage is rectified and multiplied to approximately 450 volts at output 171. This voltage may range from 400 to 475 volts and is applied across storage capacitor 161 to fire the flash lamp when triggered. A feedback loop 172 couples the output of multiplier 167 with feedback network 173, the output of which is applied to comparator 174. When the voltage on storage capacitor 161 reaches the desired level, it is sensed by the feedback network and comparator, and the comparator switches to disable the oscillator. When the voltage on the storage capacitor has been reduced, at least by a predetermined value, either by leakage or by discharge, a lower voltage appearing in the feedback network causes the comparator to switch the oscillator to an oscillating condition and quickly recharge the storage capacitor.

Figure 22:
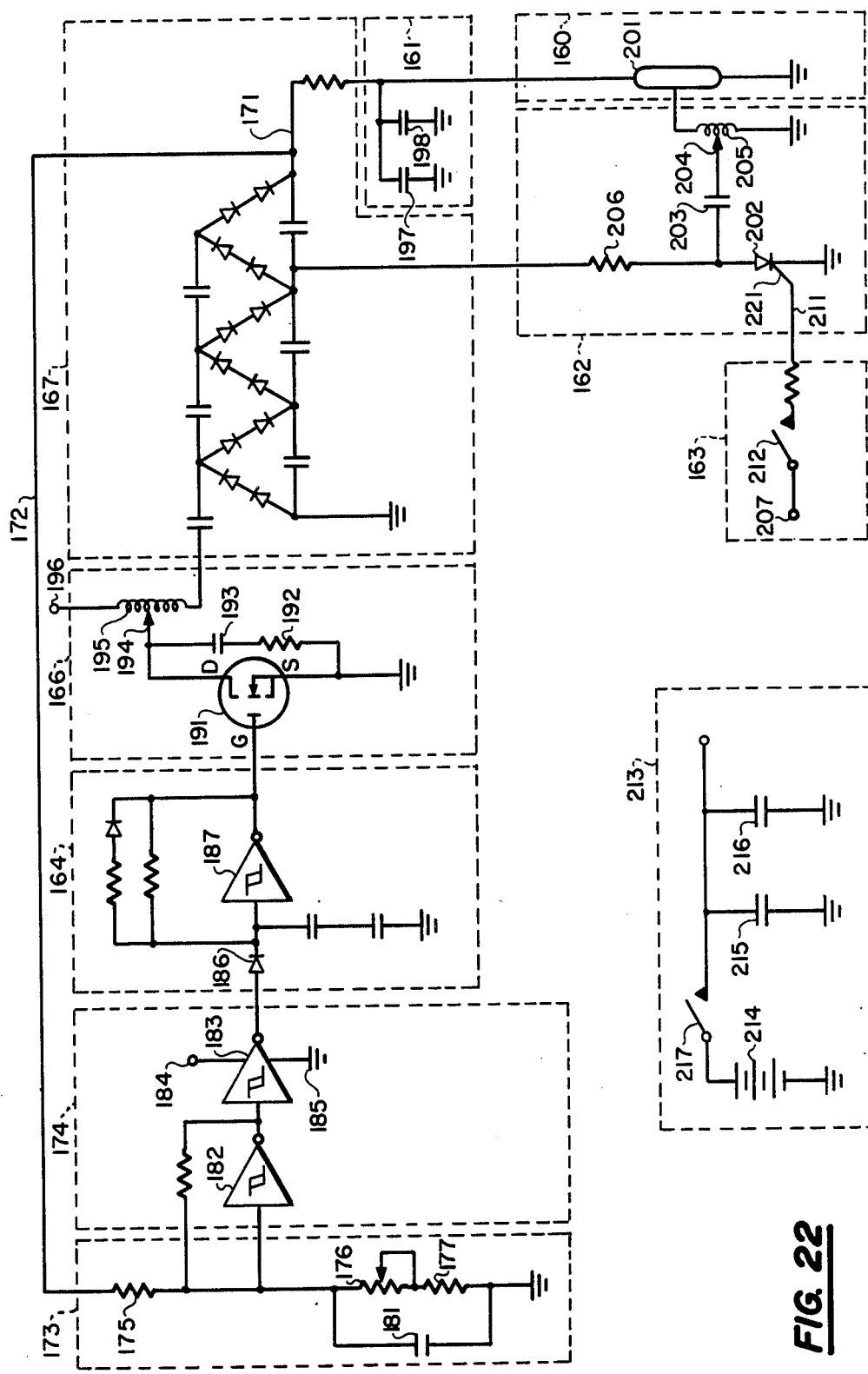
FIG. 22 is a generalized schematic diagram of the generator of FIG. 21.

The schematic diagram of FIG. 22 shows a basic example of the components in the blocks of FIG. 21. Feedback network 173 comprises a resistor 175 in series with a potentiometer 176 and another resistor 177. The potentiometer enables the level of voltage detected by the feedback network to be adjusted. Resistors 177 and potentiometer 176 are shunted by capacitor 18.

The feedback network is connected to comparator 174 comprised of Schmitt trigger elements 182 and 183. For convenience, element 183 is shown with a positive voltage input terminal 184 and a ground terminal 185. Actually, each such element in a single chip of many elements would have the positive and ground terminals. The output of the comparator is fed to diode 186 in oscillator 164, which also comprises a Schmitt trigger element 187. Elements 182, 183 and 187 are part of a single CMOS chip 40106 which is available from a number of different sources. The other diode, resistors and capacitors comprising the oscillator are common elements, typically arranged, and need not be described in detail here.

The output of the oscillator is applied to the gate terminal of field effect transistor (FET) 191, the D and S terminals of which are coupled across a series RC network comprising resistor 192 and capacitor 193. The D terminal of FET and the RC network are connected to the tap 194 of coil 195. DC voltage from the power supply is applied to one end of coil 195 through terminal 196.

The output of the DC/AC inverter 166 is connected to the input of AC/DC converter and voltage multiplier 167 which serves to rectify the medium level voltage AC signal out of the inverter and increase the voltage applied to storage capacitor 161 to approximately 450 volts. The storage capacitor is shown as being comprised of two capacitor elements 197 and 198 but this is a matter of design choice as to whether one or more capacitors are used. The charge stored in capacitor 161 is applied across tube 201 of flash lamp 160 and provides a bright flash when fired by means of trigger circuit 162 comprising silicon controlled rectifier (SCR) 202 connected through capacitor 203 to the tap 204 of coil 205. The capacitor is also connected through a resistor 206 back to AC/DC converter and voltage multiplier 167. When transistor 202 conducts, the charge stored in storage capacitor 203 triggers flash lamp 201 into conduction through trigger coil 205 for an instantaneous brilliant flash.

Trigger circuit 162 is controlled by trigger control 163 comprising DC voltage input terminal 207 connected to lead 211 of transistor 202 through on/off switch 212.

Power supply 213, which powers the entire high voltage generator, comprises battery 214 shunted by capacitors 215 and 216 through normally closed switch 217. Battery 214 may comprise more than one actual battery element, which would normally be connected in parallel. The B+ voltage, which is contemplated as being a simple 9-volt battery, is applied as indicated to comparator 174 and DC/AC inverter 166, as well as to trigger control circuit 163.

In operation, assuming storage capacitor 161 is fully charged, when on/off switch 212 is closed a positive voltage is applied to gate 221 of SCR 202 causing the SCR to immediately conduct causing the entire voltage on the storage capacitor to be applied across flash lamp 201, resulting in a bright flash of extremely short duration. This conduction is substantially instantaneous and the circuit then senses, through feedback loop 172 and circuit 173, that the voltage is a lower than desired full-charge level and will immediately trigger oscillator 164 into operation to recharge the capacitor. When the capacitor reaches the desired full charge, typically 450 volts, the feedback network 173 and comparator 174 sense that the desired voltage has been reached and disable the oscillator, thereby saving battery power. Due to leakage over a period of time, the charge on capacitor 161 may be reduced somewhat. This circuit can be adjusted to detect as little as four to six volts decrease in the charge in capacitor 161 and again through comparator 174 actuate oscillator 164 to bring the charge up to its full desired value. The time to charge the storage capacitor from full discharge may vary but about one second is adequate for most purposes.

The basic circuit of FIGS. 21 and 22 can be applied to several different devices with minor modifications. A dual flash unit (FIG. 23) employs two of the circuits shown in FIG. 1 controlled by the trigger control circuitry to alternately flash two flash units such as for a car top emergency signal. Another modification is for a multiple sequential flash unit (FIG. 24) which operates generally as does the circuit of FIG. 21.

As indicated previously, there are some flash lamp devices which turn the charging circuit off when the storage capacitor is fully charged. Many of these systems allow the charge on the storage capacitor to be reduced by twenty to twenty-five volts before recharging occurs, due to several possible factors inherent in their circuitry. Because of the precision, simplicity and efficiency of the components and the circuits of the present invention, a charge reduction of four to six volts will be detected by the feedback network and comparator, resulting in recharging the storage capacitor. Frequent, small increment charging uses very little energy, much less than larger amounts of charging which occur less often. Another advantage of the present system is that the charge on the storage capacitor is always up to or near peak so there is no danger that the flash tube would be actuated at a low point, as much as five percent below peak, which could result in less than the desired brightness of flash.

Basically, the prior art devices having an intended similar function are typically much less precise than the present invention and some of them are very temperature sensitive so that the feedback voltage necessary to actuate the charging oscillator could vary greatly with temperature. This is especially true for those devices which depend on the leakage characteristics of a transistor to terminate the charging function. The feedback network and comparator of the present invention are extremely precise and efficient so that very little energy is used while at the same time the charge on the storage capacitor is maintained at the desired level with an extremely low variation. The switching technology used in this invention is very efficient and precise compared with linear technology or flyback transformers previously used.

Figure 23:
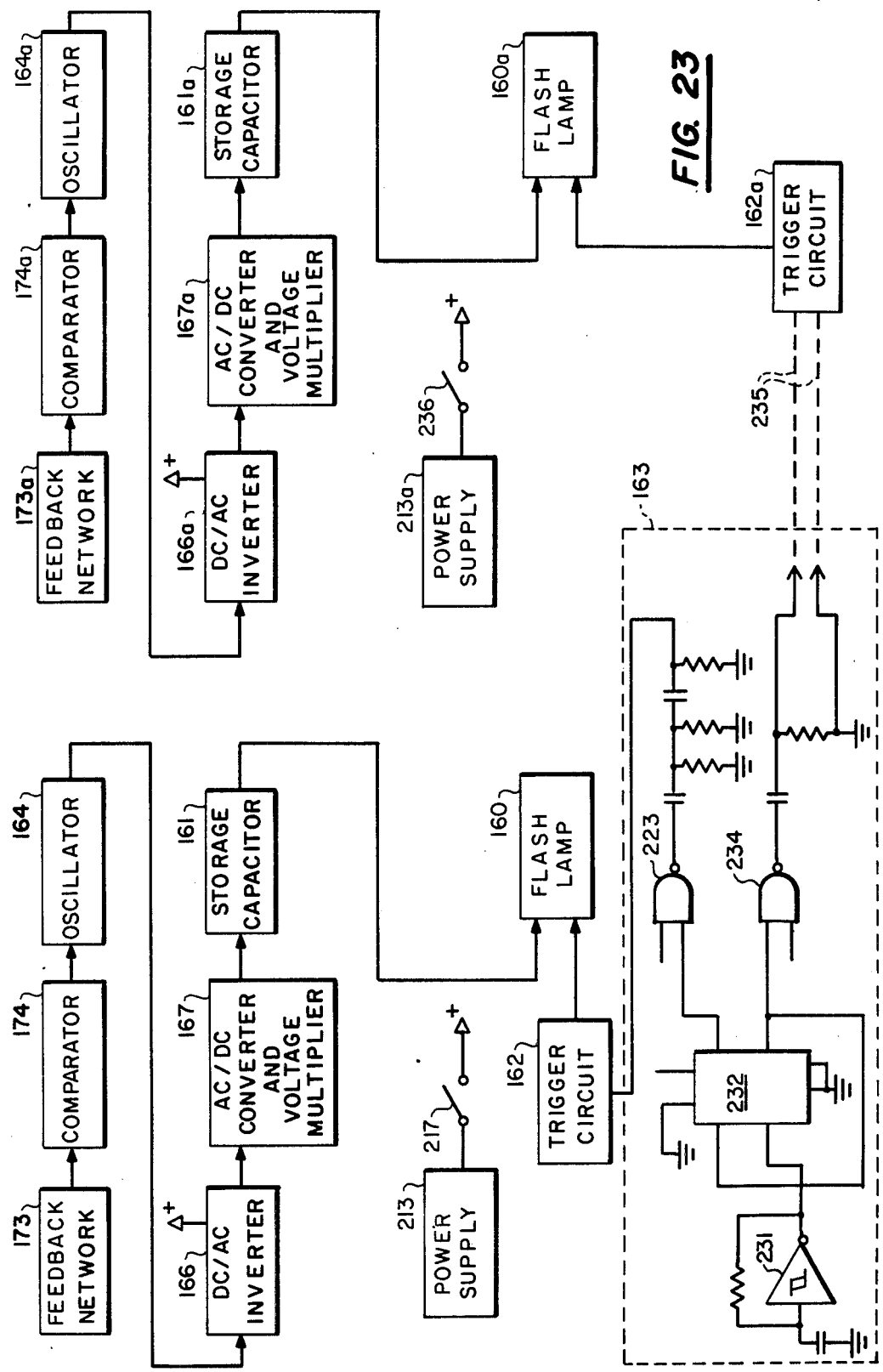
FIG. 23 is a schematic diagram of the generator of FIG. 21 configured for the dual alternating flash emergency unit of FIGS. 13 and 14.

The circuit of FIG. 23 is for a dual-flash emergency signal unit and comprises two identical charging and flashing circuits which are interconnected so that they are commonly actuated. Further, it is normally desired to have the flashes of this device occur in alternating fashion as opposed to simultaneously, so that one flash lamp will discharge followed by the other in indefinite sequence. The left side of the circuitry in FIG. 23 is termed the "master unit" and the right side as the "slave unit." The basic elements set forth in the block diagram of FIG. 21 and in the circuit diagram of FIG. 22 are substantially identical in each unit of FIG. 23. The circuit elements of the slave unit on the right side of FIG. 23 which are the same as those in the master are designated by the subscript "a".

The trigger control circuit 163 comprises a Schmitt trigger 231 which controls a flip-flop 232, the output of which goes to gate elements 233 and 234. The output of gate 233 controls trigger circuit 162 of the master unit and the output of gate 234, through a pair of conductive telescoping rods 235, controls the trigger circuit 162a of the slave unit. In the stored condition rods 235 are telescoped together, on/off switch 236 in power supply 213 is open, and the master and slave flash units are closely adjacent. When deployed, the units are pulled apart to extend the rods and on/off switch 236 is closed to charge the storage capacitor and commence operation of the signals. The signal unit may be so configured that the act of pulling the master and slave units apart automatically closes switch 236.

The charge time of each storage capacitor of the dual emergency unit of FIG. 23 is substantially the same as the generalized unit discussed previously, that is, about one second. It is anticipated that the flashes will occur at intervals which are equal to or greater than one second so the charging circuit operates in the same manner as previously described. Thus the charging function will occur within about one second and the feedback network and comparator will function to stop the oscillator and thereby the charging of the capacitor. When this unit is operating normally, it is anticipated that little or no leakage will occur in the capacitor in the few moments between flashing intervals. However, even if such leakage should occur, the system will function just as described with respect to the previous embodiment and the charge will be maintained within a very few volts, approximately one percent. Of course, the charging time could be reduced, the flash frequency decreased, or any other similar changes could be made.

Figure 24:
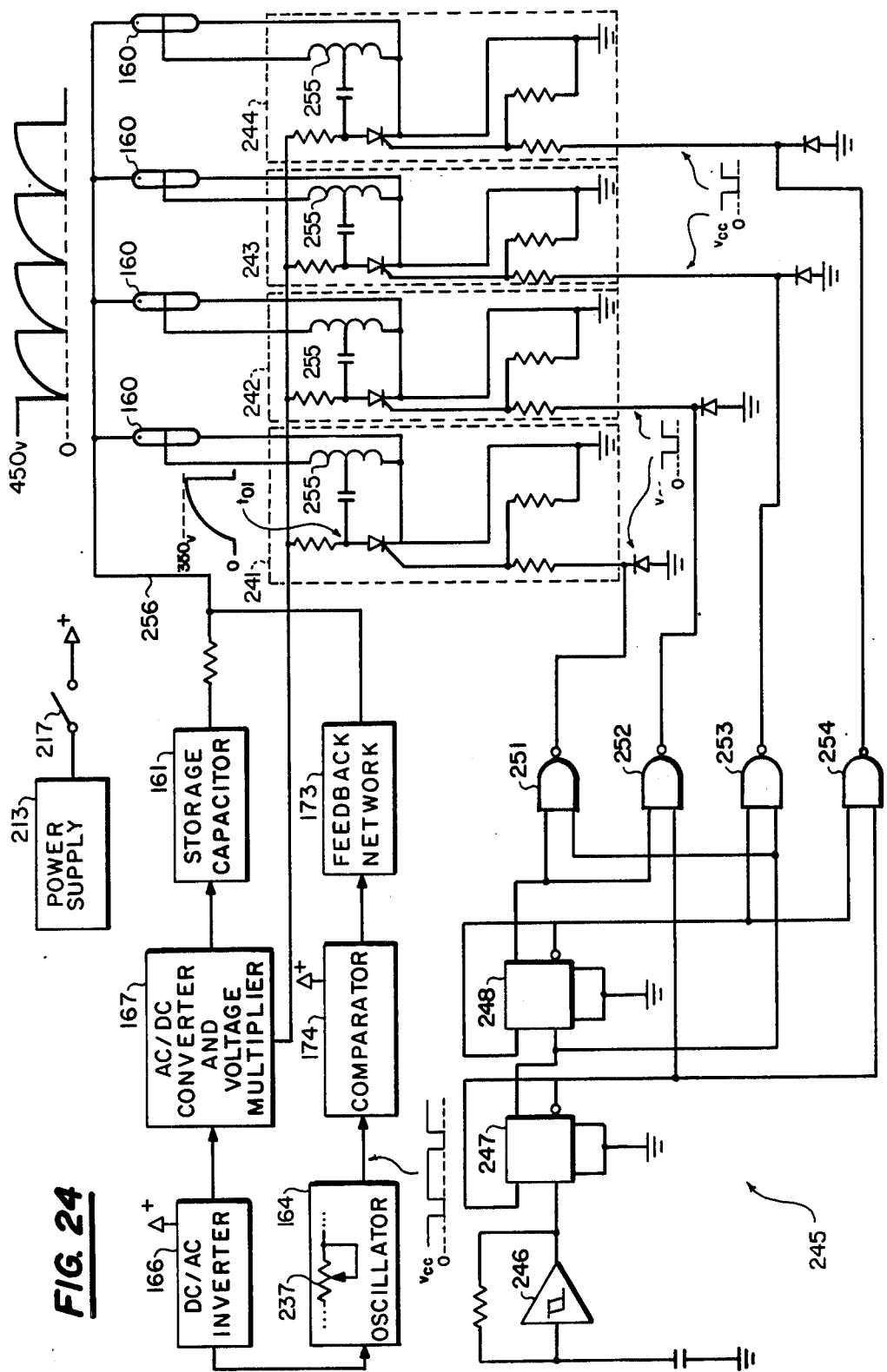
FIG. 24 is a schematic diagram of the generator of FIG. 21 configured to operate with the sequential four-flash emergency unit of FIGS. 1 and 11.

The circuit of FIG. 24 is also designed for an emergency unit, this circuit providing four discreet flashes in sequence. The purpose for sequential flashes is not only to attract attention but to possibly spell out a word where the flashes are positioned behind transparent or translucent sheets having contrasting letters or numerals in the faces thereof. Additionally, the sequence could be such as to create an arrow effect.

Feedback network 173 and comparator 174 are substantially identical with the embodiments previously described. Oscillator 164 includes an adjustable resistor 237 to vary the duty cycle of the oscillator. The power supply 213 coupled to inverter 166 through on/off switch 217 is the same as before. Likewise, converter/multiplier 167 and storage capacitor 161 are as previously described.

The basic differences in the FIG. 24 voltage generator are centered around the fact that there are four flash tubes 160 and four trigger circuits 241–244 controlled by trigger control circuit 245. Each combination of trigger circuit and flash tube is substantially the same as previously described. However, the tubes flash in sequence pursuant to signals applied from the trigger circuits due to the sequential control of trigger control 245. Circuit 245 comprises a Schmitt trigger oscillator circuit 246 feeding toggling flip-flops 247 and 248 which in turn control the sequential operation of NAND gates 251, 252, 253 and 254. The outputs of each of these NAND gates controls the appropriate trigger circuit. Note that the trigger signal applied to the gate of each SCR in the trigger circuits is at a constant positive voltage $V_{cc}$ which goes to zero for a short time and at time $t_o$ it returns to the $V_{cc}$ level. The primary reason for maintaining the positive voltage on the SCR gates is to keep the SCR conducting and make the flash tube circuits non-responsive to noise pulses which may occur in the circuitry. When an SCR conducts, a short duration voltage spike of about 4000 volts is applied to the flash tube through coil 255, causing the very short duration but brilliant flash.

Figure 25:
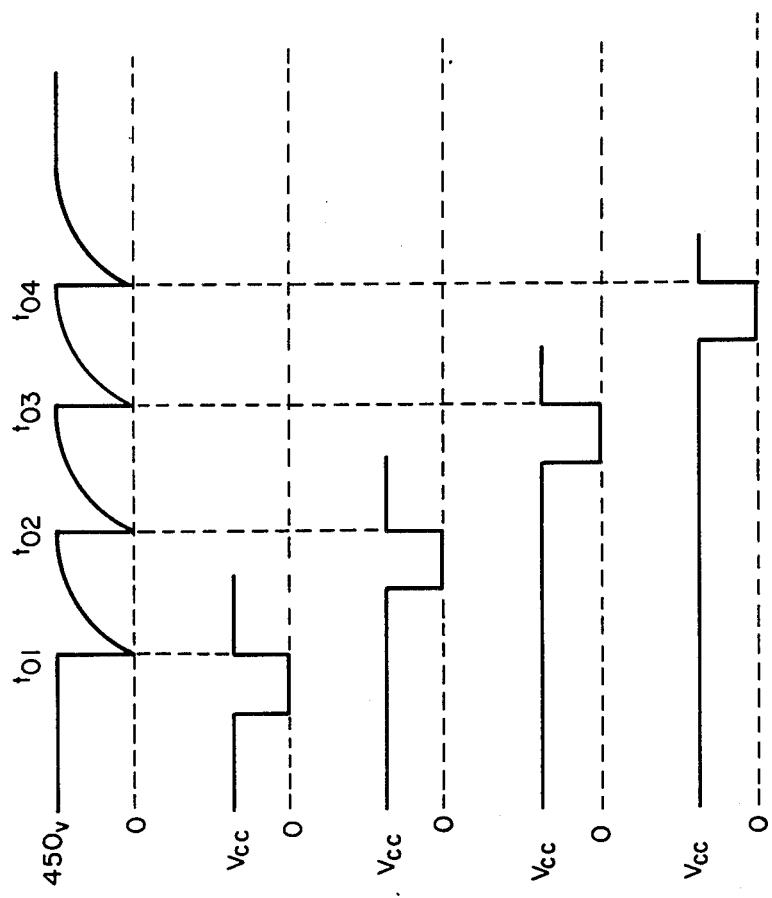
FIG. 25 shows the timing waveforms for triggering the generator of FIG. 24.

When the unit of FIG. 24 is actuated by closing on/off switch 217, within about one second or less, power supply 213 has charged storage capacitor 161 which is coupled across each of flash tubes 160. Pursuant to the sequential operation of trigger control 245, trigger circuits 241, 242, 243 and 244 fire the flash tubes in sequence. The waveform diagram of FIG. 25 shows the voltage on line 256 as it behaves through one cycle of four flashes, in relation to the trigger signal applied to the gate of each SCR in sequence. Time $t_{o1}$ is the instant of triggering the first flash lamp, $t_{o2}$ is the instant of triggering the second flash lamp, and so on.

In order to conserve power and make the circuit as efficient as possible, only one power supply and one storage capacitor 161 are used for the four-flash unit of FIG. 24. As each tube is flashed, the oscillator functions to recharge the storage capacitor. Each flash tube is triggered after the storage capacitor has reached full charge, at approximately one second intervals. As in the other embodiments, when storage capacitor 161 achieves full charge of approximately 450 volts DC, the charging circuit is shifted to a quiescent condition because of feedback network 173 and comparator 174.

In view of the above description, it is likely that improvements and modifications will occur to those skilled in the art which are within the scope of the accompanying claims.

What is claimed is:
1. An emergency signal comprising:
 a base;
 signalling means extending from said base, said signalling means including an enclosure and high intensity flash lamp means inside said enclosure;
 substantially planar, substantially rigid window means in at least one side of said enclosure, said window means being adjacent and spaced from said high intensity flash lamp means;
 a DC power source for energizing said flash lamp means;
 actuating means in said base electrically connecting said signalling means through switch means to said power source;
 said actuating means including storage capacitor means connected across said flash lamp means whereby said storage capacitor means remains substantially uncharged when said switch means is open; and
 means to maintain said storage capacitor means at substantially full charge and to recharge said storage capacitor means immediately upon discharge through said switch means when said switch means is closed;
 whereby high intensity light flashes are visible through said window means when said switch means is closed.

2. The emergency signal recited in claim 1 wherein said high intensity flash lamp means and said actuating means comprise a strobe unit.

3. The emergency signal recited in claim 1 wherein said signalling means is in telescoping arrangement with said base whereby said signalling means can be retracted into said base when not in use.

4. The emergency signal recited in claim 3 wherein the signalling means comprises a plurality of telescoping sections of incrementally decreasing size deployed from a stored mode nested within said base to a vertically extended mode and each of said sections has a high intensity lamp and a window adjacent said high intensity lamp.

5. The emergency signal recited in claim 3 wherein said window means include indicia thereon.

6. The emergency signal recited in claim 4 wherein said window means are of different colors.

7. The emergency signal recited in claim 1 wherein said window means comprises light transmissive material.

8. The emergency signal recited in claim 7 wherein said light transmissive material is transparent.

9. The emergency signal recited in claim 7 wherein said light transmissive material is translucent.

10. The emergency signal recited in claim 7 wherein said light transmissive material is polarized.

11. The emergency signal recited in claim 4 wherein said actuating means includes a power distribution system for sequentially flashing said lamps.

12. The emergency signal recited in claim 5 wherein said actuating means includes a power distribution system for sequentially flashing said lamps.

13. The emergency signal recited in claim 4 wherein a cover is attached to the top of said signalling means in the extended mode and latch means is provided for latching said cover to said base to define a self-contained container when not in use.

14. The emergency signal recited in claim 13 wherein said base and cover contain cooperating switch means to automatically close the circuit through the high intensity flash lamp means when said cover is raised to deploy said sections in vertically extended array.

15. The emergency signal recited in claim 2 wherein said emergency signal comprises:
 two said bases and signalling means;
 telescoping means interconnecting said two bases;
 whereby each said signalling means is actuable independently and sequentially with respect to the other.

16. The emergency signal recited in claim 15 wherein said bases further comprise magnetic friction increasing rubber pads on the bottom of each said base.

17. The emergency signal recited in claim 2 wherein said window means and signalling means comprise a transparent top connected to said base, said top being connected to said actuating means to energize said flash lamp means upon rotation of said top through a predetermined angle.

18. The emergency signal recited in claim 2 wherein:
said base is the bottom of a triangular housing;
said signalling means and window means comprise the two sides of said triangular housing formed of spaced substantially planar faces each formed with a central triangular transparent portion.

19. The emergency signal recited in claim 18 and further comprising reflectorized tape around said triangular portion.

20. The emergency signal recited in claim 18 wherein said base, signalling means and window means comprise a housing of triangular shape, said housing being formed of two identical molded halves fit together.

21. An emergency signal comprising:
a base;
signalling means spaced from said base and including high intensity flash lamp means;
window means in said signalling means adjacent said high intensity flash lamp means;
a DC power source for energizing said flash lamp means;
actuating means in said base electrically connected through switch means to power source, said high intensity light flashes being visible through said window means when said switch means is closed;
storage capacitor means connected across said flash lamp means;
means connected to said flash lamp means for triggering said flash lamp means into conduction;
oscillator means coupled to said source of DC power;
a DC/AC inverter connected to the output of said oscillator means and to said DC power source;
an AC/DC converter and voltage multiplier connected between said DC/AC inverter and said storage capacitor means;
a feedback network;
comparator means connected between said feedback network and said oscillator; and
means for coupling the voltage output from said voltage multiplier to said feedback network, said comparator means actuating said oscillator means when a predetermined reduction in the voltage on said storage capacitor means is detected;
whereby said storage capacitor means is maintained at a desired voltage level sufficient to actuate said flash lamp means as desired.

22. The emergency signal recited in claim 21 wherein said triggering means comprises a trigger circuit connected between said flash lamp means and said source of DC power.

23. The emergency signal recited in claim 21 wherein said oscillator operates at about 25 KHz.

24. The emergency signal recited in claim 21 wherein said DC/AC inverter has an AC output amplified 10 to 15 times above the voltage value of said DC power source input.

25. The emergency signal recited in claim 24 wherein said AC/DC converter converts said AC signal to DC and said voltage multiplier amplifies the voltage input to a level of about 450 volts.

26. The emergency signal recited in claim 21 wherein said feedback network comprises a variable resistor adapted to adjust the voltage level at which said comparator triggers said oscillator into oscillation.

27. The emergency signal recited in claim 21 wherein said comparator comprises a Schmitt trigger.

28. The emergency signal recited in claim 21 wherein said DC/AC inverter comprises a field effect transistor (FET), the conduction of which is controlled by the output of said oscillator.

29. The emergency signal recited in claim 28 wherein said DC power is applied to said DC/AC inverter through one end of a coil having a tap intermediate its ends, said FET being connected to said tap, the other end of said coil being connected to said AD/DC converter.

30. The emergency signal recited in claim 21 and further comprising an enabling switch connected between said DC power source and said triggering means.

31. The emergency signal recited in claim 21 wherein the predetermined reduction in the level of the voltage on said storage capacitor is about 1% of the desired level.

32. The emergency signal recited in claim 21 and further comprising second signalling and actuator means, comprising:
a second flash lamp;
a second storage capacitor connected across said second flash lamp;
second means connected to said second flash lamp for triggering said second flash lamp into conduction;
a second DC power source;
a second oscillator coupled to said second source of DC power;
a second DC/AC inverter connected to the output of said second oscillator and to said second DC power source;
a second AC/DC converter and voltage multiplier connected between said second DC/AC inverter and said second storage capacitor;
a second feedback network;
a second comparator connected between said second feedback network and said second oscillator; and
second means for coupling the voltage output from said second voltage multiplier to said second feedback network, said second comparator actuating said second oscillator when a predetermined reduction in the voltage on said second storage capacitor is detected;
trigger control means coupled to said respective triggering means of said high voltage generator and said second high voltage generator;
whereby said trigger control means causes said flash lamp and said second flash lamp to flash in regular alternating sequence.

33. The emergency signal recited in claim 21 wherein:
said flash lamp means comprises a plurality of flash lamps connected in parallel;
said triggering means comprises a like plurality of trigger circuits connected to respective said flash lamps;
said generator further comprising trigger control means connected to said trigger circuits to actuated said flash lamps in a predetermined repetitive sequence.

34. An emergency signal comprising:
a base member;
at least one plural-sided telescoping box deployable from a stored mode nested within said base to an extended mode;
detent means for releasably retaining said box in the extended mode;
said box having a light-transmitting symbol on at least one side thereof;

means inside said box for illuminating the respective symbol thereon;

a top attached to said box when in the extended mode; and latch means for latching said top to said base with said box inside to define a self-contained container when not in use.

35. The emergency signal recited in claim 34 wherein said illuminating means comprises a controlled high voltage generator comprising:

flash lamp means;

storage capacitor means connected across said flash lamp means;

means connected to said flash lamp means for triggering said flash lamp means into conduction;

a DC power source;

oscillator means coupled to said source of DC power;

a DC/AC inverter connected to the output of said oscillator means and to said DC power source;

an AC/DC converter and voltage multiplier connected between said DC/AC inverter and said storage capacitor means;

a feedback network;

comparator means connected between said feedback network and said oscillator; and means for coupling the voltage output from said voltage multiplier to said feedback network, said comparator means actuating said oscillator means when a predetermined reduction in the voltage on said storage capacitor means is detected;

whereby said storage capacitor means is maintained at a desired voltage level sufficient to actuate said flash lamp means as desired.

36. The emergency signal recited in claim 35 wherein said triggering means comprises a trigger circuit connected between said flash lamp means and said source of DC power.

37. The emergency signal recited in claim 35 wherein said oscillator operates at about 25 KHz.

38. The emergency signal recited in claim 35 wherein said DC/AC inverter has an AC output amplified 10 to 15 times above the voltage value of said DC power source input.

39. The emergency signal recited in claim 38 wherein said AC/DC converter converts said AC signal to DC and said voltage multiplier amplifies the voltage input to a level of about 450 volts.

40. The emergency signal recited in claim 35 wherein said feedback network comprises a variable resistor adapted to adjust the voltage level at which said comparator triggers said oscillator into oscillation.

41. The emergency signal recited in claim 35 wherein said comparator comprises a Schmitt trigger.

42. The emergency signal recited in claim 35 wherein said DC/AC inverter comprises a field effect transistor (FET), the conduction of which is controlled by the output of said oscillator.

43. The emergency signal recited in claim 42 wherein said DC power is applied to said DC/AC inverter through one end of a coil having a tap intermediate its ends, said FET being connected to said tap, the other end of said coil being connected to said AC/DC converter.

44. The emergency signal recited in claim 35 and further comprising an enabling switch connected between said DC power source and said triggering means.

45. The emergency signal recited in claim 35 wherein the predetermined reduction in the level of the voltage on said storage capacitor is about 1% of the desired level.

46. The emergency signal recited in claim 35 wherein:

said flash lamp means comprises a plurality of flash lamps connected in parallel;

said triggering means comprises a like plurality of trigger circuits connected to respective said flash lamps;

said generator further comprising trigger control means connected to said trigger circuits to actuated said flash lamps in a predetermined repetitive sequence.

47. The emergency signal recited in claim 34 wherein:

at least two plural-sided telescoping boxes of incrementally decreasing size are deployable from a stored mode nested within said base to an extended mode;

each said box has a light-transmitting symbol on at least one side thereof;

each said box has illuminating means inside for illuminating the respective symbol thereon;

said top being attached to the uppermost of said boxes when in the extended mode.

48. The emergency signal recited in claim 47 wherein said light means comprises a light for each separate one of said symbols and a power distribution system for sequentially illuminating said lights and continuously repeating this sequence.

49. The emergency signal recited in claim 47 wherein said symbols are letters of the alphabet arranged to spell an emergency message.

50. The emergency signal recited in claim 49 wherein said light means comprises a light for each separate one of said letters and a power distribution system for sequentially illuminating said lights to spell out said emergency message letter by letter.

51. The emergency signal recited in claim 50 wherein said light means comprises strobe lights to create short, high intensity flashes for each light in turn.

52. The emergency signal recited in claim 47 wherein said signal is battery powered and said base and top contain cooperating switch means to automatically connect said illuminating means with said battery when said top is raised to deploy said boxes in vertically extended array.

53. The emergency signal recited in claim 47 wherein each of said boxes has a pair of opposed lateral sides and a pair of longitudinal sides, at least one of said sides displays one of said symbols thereon, said illuminating means comprising a reflector panel parallel to and spaced from the side displaying said symbol, each of said boxes mounting an individual illuminating means.

54. The emergency signal recited in claim 53 wherein said reflector panels are mounted to and span between the lateral sides of the respective boxes, said panels being mounted on lateral supports extending from one of the walls of the respective box.

55. The emergency signal recited in claim 54 wherein each of said panels is offset from the panel of the next larger box to permit nesting of said boxes.

56. The emergency signal recited in claim 34 wherein said base is formed with a clip so that the signal can be clipped to a partially opened vehicle window.

57. The emergency signal recited in claim 47 wherein said detent means comprises outwardly extending projections on each box to rest on the upper edge of the box below.

58. The emergency signal recited in claim 34 wherein said base includes a plurality of outwardly pivotable legs to widen the support of said base.

59. The emergency signal recited in claim 58 wherein said legs each mounts a magnet such that said signal can be securely engaged on a ferromagnetic surface.

60. The emergency signal recited in claim 34 wherein said base includes a handle and said base and top define a small container for transport in the collapsed mode.

61. An emergency signal comprising:
a base member;
a light transmissive top rotatably mounted to said base member;
high intensity flash lamp means within said top;
a DC power source comprising battery means mounted in said base member; and
lamp control means mounted in said base member;
said top having a plurality of operative positions, the signal being in a quiescent state when said top is in a first position, said battery means being accessible for removal from said base member when said top is in a second position, and said lamp being actuated when said top is in a third position.

62. The emergency signal recited in claim 61, wherein said lamp control means comprises:
storage capacitor means connected across said flash lamp means;
means connected to said flash lamp means for triggering said flash lamp means into conduction;
oscillator means coupled to said source of DC power;
a DC/AC inverter connected to the output of said oscillator means and to said DC power source;
an AC/DC converter and voltage multiplier connected between said DC/AC inverter and said storage capacitor means;
a feedback network;
comparator means connected between said feedback network and said oscillator; and
means for coupling the voltage output from said voltage multiplier to said feedback network, said comparator means actuating said oscillator means when a predetermined reduction in the voltage on said storage capacitor means is detected;
whereby said storage capacitor means is maintained at a desired voltage level sufficient to actuate said flash lamp means as desired.

63. The emergency signal recited in claim 62 wherein said triggering means comprises a trigger circuit connected between said flash lamp means and said source of DC power.

64. The emergency signal recited in claim 62 wherein said oscillator operates at about 25 KHz.

65. The emergency signal recited in claim 62 wherein said DC/AC inverter has an AC output amplified 10 to 15 times above the voltage value of said DC power source input.

66. The emergency signal recited in claim 65 wherein said AC/DC converter converts said AC signal to DC and said voltage multiplier amplifies the voltage input to a level of about 450 volts.

67. The emergency signal recited in claim 62 wherein said feedback network comprises a variable resistor adapted to adjust the voltage level at which said comparator triggers said oscillator into oscillation.

68. The emergency signal recited in claim 62 wherein said comparator comprises a Schmitt trigger.

69. The emergency signal recited in claim 62 wherein said DC/AC inverter comprises a field effect transistor (FET), the conduction of which is controlled by the output of said oscillator.

70. The emergency signal recited in claim 69 wherein said DC power is applied to said DC/AC inverter through one end of a coil having a tap intermediate its ends, said FET being connected to said tap, the other end of said coil being connected to said AC/DC converter.

71. The emergency signal recited in claim 62 and further comprising an enabling switch connected between said DC power source and said triggering means.

72. The emergency signal recited in claim 62 wherein the predetermined reduction in the level of the voltage on said storage capacitor is about 1% of the desired level.

73. The emergency signal recited in claim 61 and further comprising;
a radio transmitter mounted in said base member;
said radio transmitter being actuated for repeated emergency signal transmission when said top is in the third position.

74. The emergency signal recited in claim 61 and further comprising belt engaging means for hanging said signal from a person's belt.

75. The emergency signal recited in claim 61 and further comprising a clip for hanging signal from a flat surface.

76. An emergency signal comprising:
a base member;
at least one second member telescopically connected to said base member, said base member and said second member being together in a stored mode and being separated in an operative mode;
means for releasably retaining said base member and said second member in the stored mode;
at least one of said base member and said second member having a light transmissive surface on at least one side thereof;
means inside said one member for illuminating said light transmissive surface; and
control means for actuating said illuminating means.

77. The emergency signal recited in claim 76 wherein said illuminating means and said control means comprise a controlled high voltage generator comprising:
flash lamp means;
storage capacitor means connected across said flash lamp means;
means connected to said flash lamp means for triggering said flash lamp means into conduction;
a DC power source;
oscillator means coupled to said source of DC power;
a DC/AC inverter connected to the output of said oscillator means and to said DC power source;
an AC/DC converter and voltage multiplier connected between said DC/AC inverter and said storage capacitor means;
a feedback network;
comparator means connected between said feedback network and said oscillator; and
means for coupling the voltage output from said voltage multiplier to said feedback network, said comparator means actuating said oscillator means when a predetermined reduction in the voltage on said storage capacitor means is detected;
whereby said storage capacitor means is maintained at a desired voltage level sufficient to actuate said flash lamp means as desired.

78. The emergency signal recited in claim 77 wherein said triggering means comprises a trigger circuit connected between said flash lamp and said source of DC power.

79. The emergency signal recited in claim 77 wherein said oscillator operates at about 25 KHz.

80. The emergency signal recited in claim 77 wherein said DC/AC inverter has an AC output amplified 10 to 15 times above the voltage value of said DC power source input.

81. The emergency signal recited in claim 80 wherein said AC/DC converter converts said AC signal to DC and said voltage multiplier amplifies the voltage input to a level of about 450 volts.

82. The emergency signal recited in claim 77 wherein said feedback network comprises a variable resistor adapted to adjust the voltage level at which said comparator triggers said oscillator into oscillation.

83. The emergency signal recited in claim 77 wherein said comparator comprises a Schmitt trigger.

84. The emergency signal recited in claim 77 wherein said DC/AC inverter comprises a field effect transistor (FET), the conduction of which is controlled by the output of said oscillator.

85. The emergency signal recited in claim 84 wherein said DC power is applied to said DC/AC inverter through one end of a coil having a tap intermediate its ends, said FET being connected to said tap, the other end of said coil being connected to said AD/DC converter.

86. The emergency signal recited in claim 77 and further comprising an enabling switch connected between said DC power source and said triggering means.

87. The emergency signal recited in claim 77 wherein the predetermined reduction in the level of the voltage on said storage capacitor is about 1% of the desired level.

88. The emergency signal recited in claim 77 and further comprising a second high voltage generator comprising:
a second flash lamp;
a second storage capacitor connected across said second flash lamp;
second means connected to said second flash lamp for triggering said second flash lamp into conduction;
a second DC power source;
a second oscillator coupled to said second source of DC power;
a second DC/AC inverter connected to the output of said second oscillator and to said second DC power source;
a second AC/DC converter and voltage multiplier connected between said second DC/AC inverter and said second storage capacitor;
a second feedback network;
a second comparator connected between said second feedback network and said second oscillator; and
second means for coupling the voltage output from said second voltage multiplier to said second feedback network, said second comparator actuating said second oscillator when a predetermined reduction in the voltage on said second storage capacitor is detected;
trigger control means coupled to said respective triggering means of said high voltage generator and said second high voltage generator;
whereby said trigger control means causes said flash lamp and said second flash lamp to flash in regular alternating sequence.

89. The emergency signal recited in claim 77 wherein:
said flash lamp means comprises a plurality of flash lamps connected in parallel;
said triggering means comprises a like plurality of trigger circuits connected to respective said flash lamps;
said generator further comprising trigger control means connected to said trigger circuits to actuated means said flash lamps in a predetermined repetitive sequence.

90. The emergency signal recited in claim 76 wherein:
said base member and said second member are substantially similar facing members, said signal further comprising:
means for telescopically connecting said members together; and
means for actuating said control means upon separation of said base member from said second member.

91. An emergency signal comprising:
a housing formed with at least two triangular surfaces;
light transmissive window means in at least one of said surfaces;
means for supporting said housing on a substantially flat surface;
a high intensity lamp within said housing positioned so as to be visible through said window means;
lamp control means mounted in said housing.

92. The emergency signal recited in claim 91 wherein said lamp and lamp control means comprises a controlled high voltage generator comprising:
flash lamp means;
storage capacitor means connected across said flash lamp;
means connected to said flash lamp for triggering said flash lamp into conduction;
a DC power source
oscillator means coupled to said source of DC power;
a DC/AC inverter connected to the output of said oscillator means and to said DC power source;
an AC/DC converter and voltage multiplier connected between said DC/AC inverter and said storage capacitor means;
a feedback network;
comparator means connected between said feedback network and said oscillator; and
means for coupling the voltage output from said voltage multiplier to said feedback network, said comparator means actuating said oscillator means when a predetermined reduction in the voltage on said storage capacitor means is detected;
whereby said storage capacitor means is maintained at a desired voltage level sufficient to actuate said flash lamp as desired.

93. The emergency signal recited in claim 92 wherein said triggering means comprises a trigger circuit connected between said flash lamp and said source of DC power.

94. The emergency signal recited in claim 92 wherein said oscillator operates at about 25 KHz.

95. The emergency signal recited in claim 92 wherein said DC/AC inverter has an AC output amplified 10 to 15 times above the voltage value of said DC power source input.

96. The emergency signal recited in claim 95 wherein said AC/DC converter converts said AC signal to DC and said voltage multiplier amplifies the voltage input to a level of about 450 volts.

97. The emergency signal recited in claim 92 wherein said feedback network comprises a variable resistor adapted to adjust the voltage level at which said comparator triggers said oscillator into oscillation.

98. The emergency signal recited in claim 92 wherein said comparator comprises a Schmitt trigger.

99. The emergency signal recited in claim 92 wherein said DC/AC inverter comprises a field effect transistor (FET), the conduction of which is controlled by the output of said oscillator.

100. The emergency signal recited in claim 99 wherein said DC power is applied to said DC/AC inverter through one end of a coil having a tap intermediate its ends, said FET being connected to said tap, the other end of said coil being connected to said AC/DC converter.

101. The emergency signal recited in claim 92 and further comprising an enabling switch connected between said DC power source and said triggering means.

102. The emergency signal recited in claim 92 wherein the predetermined reduction in the level of the voltage on said storage capacitor is about 1% of the desired level.

103. The emergency signal recited in claim 91 wherein said housing is translucent.

104. The emergency signal recited in claim 91 and further comprising a reflectorized strip surrounding said window means.

105. The emergency signal recited in claim 91, wherein said housing comprises a pair of identical triangular elements coupled together.

106. The emergency signal recited in claim 91 wherein said housing is pyramidal, having three triangular surfaces.

107. The emergency signal recited in claim 106 wherein said housing is collapsible to a relative flat condition.

108. The emergency signal recited in claim 107 and further comprising flexible fastener means for securing two adjacent panels together when in the non-collapsed condition.

109. The emergency signal recited in claim 107 wherein one of said surfaces is formed of two interconnected triangular members, one of said triangular surfaces comprising a panel connected to the adjacent housing surface, said lamp control means being mounted to said panel.

110. The emergency signal recited in claim 106 wherein said housing is translucent.

111. The emergency signal recited in claim 106 and further comprising a reflectorized strip surrounding said window means.

* * * * *